US012597848B2

(12) United States Patent
Medina-Garcia et al.

(10) Patent No.: US 12,597,848 B2
(45) Date of Patent: Apr. 7, 2026

(54) VOLTAGE CONTROLLER USING VOLTAGE FEEDBACK AND POWER FEED-FORWARD

(71) Applicant: Infineon Technologies Austria AG, Villach (AT)

(72) Inventors: Alfredo Medina-Garcia, Munich (DE); Martin Krüger, Oberschleißheim (DE)

(73) Assignee: Infineon Technologies Austria AG, Villach (AT)

( * ) Notice: Subject to any disclaimer, the term of this patent is extended or adjusted under 35 U.S.C. 154(b) by 363 days.

(21) Appl. No.: 18/489,395

(22) Filed: Oct. 18, 2023

(65) Prior Publication Data

US 2025/0132662 A1     Apr. 24, 2025

(51) Int. Cl.
| | |
|---|---|
| *H02M 1/08* | (2006.01) |
| *H02M 1/00* | (2006.01) |
| *H02M 1/12* | (2006.01) |
| *H02M 3/157* | (2006.01) |

(52) U.S. Cl.
CPC ........... *H02M 1/08* (2013.01); *H02M 1/0016* (2021.05); *H02M 1/126* (2013.01); *H02M 3/157* (2013.01); *H02M 1/0025* (2021.05)

(58) Field of Classification Search
CPC ...... H02M 1/08; H02M 1/126; H02M 1/0016; H02M 1/4225; H02M 1/0025; H02M 1/32; H02M 3/157; H02M 3/156
See application file for complete search history.

(56) References Cited

U.S. PATENT DOCUMENTS

| | | | |
|---|---|---|---|
| 6,172,885 B1 | 1/2001 | Feldtkeller | |
| 2017/0373585 A1* | 12/2017 | Anwar | H02M 1/4225 |

OTHER PUBLICATIONS

A. Diordiev, O. Ursaru, M. Lucanu and L. Tigaeru, "A hybrid PID-fuzzy controller for dc/dc converters," Signals, Circuits and Systems, 2003. SCS 2003. International Symposium on, Iasi, Romania, 2003, pp. 97-100 vol. 1 (Year: 2003).*
Redl, Richard, et al., Near Optimum Dynamic Regulation of DC-DC Converters Using Feed-Forward of Output Current and Input Voltage with Current-Mode Control, IEEE Trans. Power Electronics, Jul. 1986, vol. PE-1, No. 3, pp. 181-192.

* cited by examiner

Primary Examiner — Monica Lewis
Assistant Examiner — Jye-June Lee
(74) Attorney, Agent, or Firm — Harrity & Harrity, LLP

(57) ABSTRACT

A method of controlling a switched-mode power supply (SMPS) based on a pulse-width modulation (PWM) control signal is provided to convert an input voltage to an output voltage. The method includes generating an error signal based on a difference between the output voltage and a target output voltage; filtering the error signal to generate a filtered error signal; generating a feed-forward signal based on at least one feed-forward parameter related to at least one of the output voltage, the input voltage, an output power of the SMPS, or an output current corresponding to the output voltage; adding the feed-forward signal and the filtered error signal to generate an integrator input signal; and applying a nonlinear integration function to the integrator input signal to generate the PWM control signal.

20 Claims, 3 Drawing Sheets

VOLTAGE CONTROLLER USING VOLTAGE FEEDBACK AND POWER FEED-FORWARD

BACKGROUND

Many functions of modern devices in automotive, consumer, and industrial applications, such as driving an electric motor or an electric machine, rely on power semiconductor devices. For example, insulated gate bipolar transistors (IGBTs), metal oxide semiconductor field effect transistors (MOSFETs), gallium nitride high electron mobility transistors (GaN HEMTs), and diodes, to name a few, have been used for various applications including, but not limited to, switches in power supplies and power converters.

A transistor typically comprises a semiconductor structure configured to conduct a load current along a load current path between two load terminal structures of the transistor. Further, the load current may be controlled by a control electrode, sometimes referred to as a gate electrode, of the transistor. For example, upon receiving a corresponding control signal from, for example, a gate driver, the control electrode may set its transistor in one of a conducting state or a blocking state. Accordingly, the semiconductor structure behaves like a switch with ON and OFF states (i.e., conducting and blocking states, respectively).

A switched-mode power supply (SMPS) is a type of power supply that uses semiconductor switching techniques to provide a desired output voltage. The SMPS may include a power switching stage and a control circuit. The power switching stage may perform a power conversion to convert an input voltage to an output voltage and to generate an output current that may be used as a load current. For example, the power switching stage may include a transistor (e.g., a power switch) for performing the power conversion. The input voltage can be a DC voltage provided from a DC supply, or a rectified DC voltage from an AC supply that has been rectified using a diode bridge along with some additional capacitive filtering. The control circuit may control a switching state of the transistor to regulate the power conversion. For example, the control circuit may control the transistor to switch between an ON state and an OFF state according to a duty cycle in order to regulate the output voltage to achieve the desired output voltage.

A converter topology of the SMPS, along with the switching scheme of the transistor implemented by the control circuit, dictates the power conversion. Possible converter topologies include a buck converter topology, a boost converter topology, a buck-boost converter topology (e.g., including a flyback converter topology and a hybrid flyback converter topology), and a boost power factor correction (PFC) converter topology. Other converter topologies also may be used. Additionally, the converter topology may include a single stage or two or more stages.

SUMMARY

In some implementations, an SMPS configured to provide an output power to a load includes a power switch configured to receive a pulse-width modulation (PWM) control signal to control the output power, wherein the SMPS is configured to use the power switch to convert an input voltage to an output voltage and generate an output current; a controller configured to regulate the PWM control signal for controlling the output voltage, wherein the controller comprises: an error generator configured to generate an error signal based on a difference between the output voltage and a target output voltage; a filter configured to generate a filtered error signal based on the error signal; a feed-forward processing circuit configured to receive at least one feed-forward parameter related to at least one of the output voltage, the output current, the output power, or the input voltage, and generate a feed-forward signal based on the at least one feed-forward parameter; a combiner configured to generate an integrator input signal based on a sum of the feed-forward signal and the filtered error signal; and a nonlinear integrator configured to apply a nonlinear integration function to the integrator input signal to generate the PWM control signal.

In some implementations, a controller configured to control an SMPS based on a PWM control signal to convert an input voltage to an output voltage includes an error generator configured to generate an error signal based on a difference between the output voltage and a target output voltage; a filter configured to generate a filtered error signal based on the error signal; a feed-forward processing circuit configured to monitor a change of an output current corresponding to a change in a load condition, a change of the output voltage, or a change of the input voltage, and generate a feed-forward signal based on the change of the output current, the change of the output voltage, or the change of the input voltage; a combiner configured to generate an integrator input signal based on a sum of the feed-forward signal and the filtered error signal; and a nonlinear integrator configured to apply a nonlinear integration function to the integrator input signal to generate the PWM control signal.

In some implementations, a method of controlling an SMPS based on a PWM control signal to convert an input voltage to an output voltage includes generating an error signal based on a difference between the output voltage and a target output voltage; filtering the error signal to generate a filtered error signal; generating a feed-forward signal based on at least one feed-forward parameter related to at least one of the output voltage, the input voltage, an output power of the SMPS, or an output current corresponding to the output voltage; adding the feed-forward signal and the filtered error signal to generate an integrator input signal; and applying a nonlinear integration function to the integrator input signal to generate the PWM control signal.

BRIEF DESCRIPTION OF THE DRAWINGS

Implementations are described herein making reference to the appended drawings.

DETAILED DESCRIPTION

Figure 1:
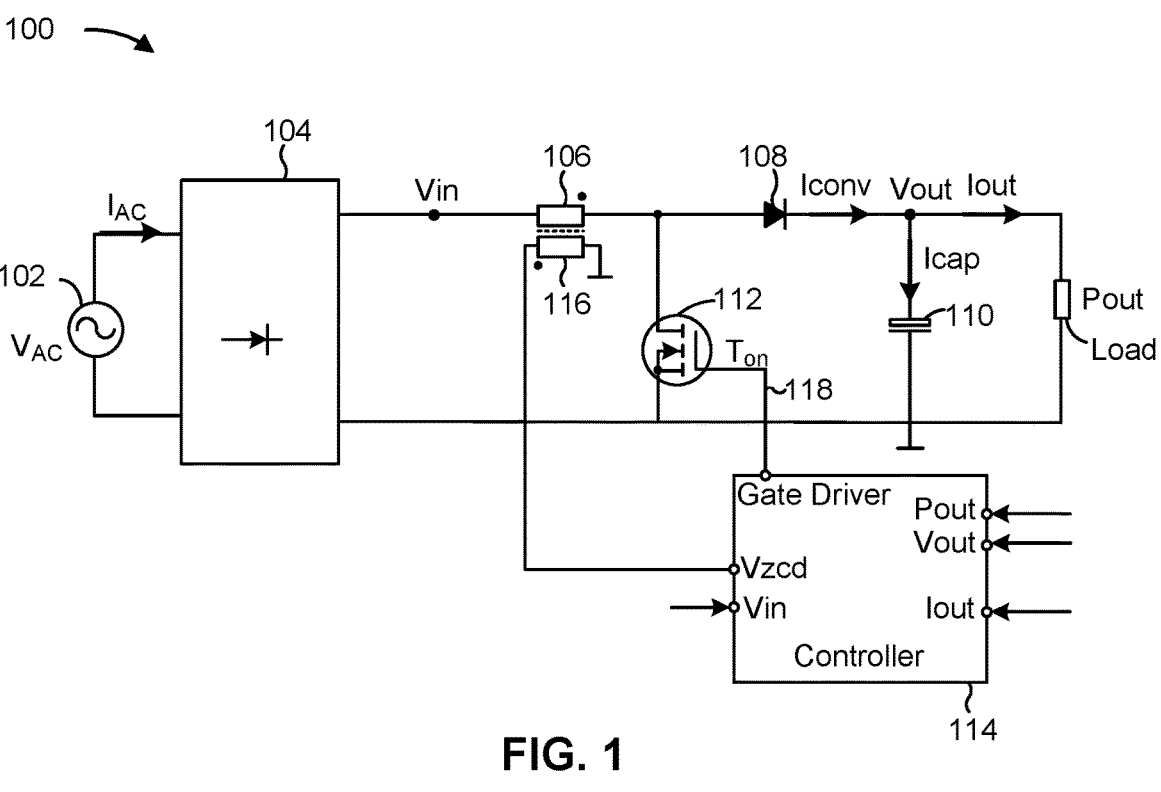
FIG. 1 illustrates a schematic block diagram of an SMPS according to one or more implementations.

In the following, details are set forth to provide a more thorough explanation of example implementations. However, it will be apparent to those skilled in the art that these implementations may be practiced without these specific details. In other instances, well-known structures and devices are shown in block diagram form or in a schematic view, rather than in detail, in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually interchangeable.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling (e.g., any connection or coupling without additional intervening elements) may also be implemented by an indirect connection or coupling (e.g., a connection or coupling with one or more additional intervening elements, or vice versa) as long as the general purpose of the connection or coupling (e.g., to transmit a certain kind of signal or to transmit a certain kind of information) is essentially maintained. Features from different implementations may be combined to form further implementations. For example, variations or modifications described with respect to one of the implementations may also be applicable to other implementations unless noted to the contrary.

As used herein, the terms "substantially" and "approximately" mean "within reasonable tolerances of manufacturing and measurement." For example, the terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of the approximate resistance value. As another example, a signal with an approximate signal value may practically have a signal value within 5% of the approximate signal value.

In the present disclosure, expressions including ordinal numbers, such as "first", "second", and/or the like, may modify various elements. However, such elements are not limited by such expressions. For example, such expressions do not limit the sequence and/or importance of the elements. Instead, such expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

A transistor can be referred to as a power switch or a transistor switch that may be used in an SMPS to convert an input voltage into an output voltage. The output voltage may be controlled using a feedback controller that regulates a control parameter of the transistor based on at least one of the output voltage, the input voltage, an output current (e.g., a load current), or an output power (e.g., a product of the output current and the output voltage). For example, the feedback controller may regulate an ON-time of the transistor to generate a target output voltage.

The feedback controller may have two nested control loops, including an inner current control loop and an outer voltage control loop. The inner current control loop should be much faster than the outer voltage control loop. While an upper limit of the inner current control loop is determined by the switching frequency, the outer voltage control loop may limit a load regulation performance. In most applications, it is not possible to implement the inner current control loop where the control parameter can be expressed by a simple formula of the output voltage, the output current, and/or the input voltage, and is fast enough for sufficient load regulation performance. An exception may be a PFC controller, where a load regulation is relatively slow to maintain a unity power factor. However, in this case, a circuit design is complicated and can be expensive.

In cases where the on-time is used as the control parameter, an inductance of an inductor used in the SMPS needs to be known by the feedback controller. However, the inductance may vary up to +/−20% due to manufacturing and production variations (e.g., high manufacturing tolerances). Thus, the inductance may not be known with a level of accuracy needed for accurate and efficient feedback control. A variation in inductance makes this feedback control difficult to implement for mass production, since each inductor would require testing-a process that can be both time-consuming and expensive to implement on a mass scale. Other feedback control schemes may also require knowledge of a component value of one or more circuit components of the SMPS or another parameter value in order to implement the feedback control. However, similar to the inductance, large manufacturing tolerances of the one or more circuit components may make it difficult to implement the feedback control scheme for mass production.

Some implementations described in this disclosure pertain to a feedback control scheme of an SMPS that does not depend on circuit component parameters to be known for implementing the feedback control scheme. Thus, the feedback control scheme may be implemented independent of a manufacturing tolerance of one or more circuit components of the SMPS. As a result, an accuracy and an efficiency of a feedback control of the SMPS can be improved. In addition, the feedback control scheme can be implemented in mass production without additional costs associated with obtaining a component value for one or more circuit components. In some implementations, knowledge of an input voltage, an inductance of an inductor, an effective turns ratio of a transformer, a flyback voltage, and/or a switching frequency of a power switch may not be needed for implementing the feedback control scheme. For example, for a boost PFC converter, neither the input voltage nor the inductance may be required to implement the feedback control scheme. For a discontinuous-conduction mode (DCM) fixed-frequency flyback converter with current control, neither the inductance nor the switching frequency may be required to implement the feedback control scheme. For a quasi-resonant flyback converter with current control, neither the effective turns ratio, nor the input voltage, nor the flyback voltage may be required to implement the feedback control scheme.

In some implementations, the feedback control scheme may include generating a normalized feed-forward signal that is derived from a feed-forward rule set that depends on a circuit topology of the SMPS. One or more feed-forward parameters that are independent of all circuit parameters may be used to generate the normalized feed-forward signal.

For example, the normalized feed-forward signal may be obtained based on at least one of the output voltage, the input voltage, the output current, or the output power, without knowledge of a component value for one or more circuit components of the SMPS. In addition, the feedback control scheme may include a nonlinear integrator configured to apply a nonlinear integration function based on the normalized feed-forward signal to generate a control signal for the transistor. The control signal may be a pulse-width modulation (PWM) control signal that controls an on-time and/or a duty cycle of the transistor.

FIG. 1 illustrates a schematic block diagram of an SMPS 100 according to one or more implementations. The SMPS 100 may be configured to provide an output power Pout to a load. For example, the SMPS 100 may convert an input voltage Vin to an output voltage Vout, and may generate an output current Iout. The output current Iout may correspond to a load current. The SMPS 100 may have a buck converter topology, a boost converter topology, a buck-boost converter topology (e.g., a flyback converter topology or a hybrid flyback converter topology), or a boost PFC converter topology. In this example, the SMPS 100 has the boost PFC converter topology.

The SMPS 100 may be coupled to AC voltage source 102 that provides an AC voltage. The SMPS 100 may include a rectifier 104, an inductor 106, a diode 108, a capacitor 110, a power switch 112, a controller 114, and a zero-crossing detection (ZCD) winding 116 that may be magnetically coupled to the inductor 106 to form a transformer. A general goal of a boost PFC converter is to turn the power switch 112 on and off rapidly and with a varying duty cycle in order to make an input AC current $I_{AC}$ sinusoidal and in phase with an input voltage $V_{AC}$.

The rectifier 104 (e.g., a diode bridge rectifier) may convert the AC voltage into the input voltage Vin (e.g., a DC input voltage). The SMPS 100 may also include an input filter that may prevent damaging voltage transients and surges from entering the SMPS 100 and causing damage within the SMPS 100. Additionally, or alternatively, the input filter may prevent any electromagnetic interference (EMI) generated within the SMPS 100 from being conducted out to the AC voltage source 102.

The inductor 106, the diode 108, and the power switch 112 may be used to generate a converter current Iconv. The capacitor 110 may store the output voltage Vout, which may then be supplied to the load. For example, the controller 114 may generate a PWM control signal 118 to control the output power Pout. In particular, the PWM control signal 118 may control an on-time and/or a duty cycle of the power switch 112. The controller 114 may regulate the PWM control signal 118 to control the output voltage Vout. Thus, the PWM control signal 118 is used to regulate a conversion of the input voltage Vin to the output voltage Vout.

The controller 114 may cycle rapidly between two states. A first state occurs when the power switch 112 is closed (e.g., the power switch 112 is in an on-state). When in the first state, the inductor 106 may be energized by the input voltage Vin. As a result, an inductor current may increase. At the same time, the diode 108 may become reverse biased (e.g., because an anode of the diode 108 is connected to ground through the power switch 112), and energy is provided to the load by the capacitor 110 (e.g., the capacitor 110 discharges).

A second state occurs when the power switch 112 is open (e.g., the power switch 112 is in an off-state). In the second state, the inductor 106 may de-energize (e.g., the inductor current decreases) as the inductor 106 supplies energy to the load and recharges the capacitor 110. For example, when the power switch is turned off, a charging current Icap may start to flow through the capacitor 110, and the capacitor 110 begins to charge. Here, a polarity of the inductor 106 may be reversed, which means a left side of the inductor 106 may be negative. As a result, two sources, the input voltage Vin and the inductor 106, are connected in series, causing a higher voltage to charge the capacitor 110 through the diode 108 and a higher output voltage Vout to be supplied to the load. A cycling between the first state and the second state may be performed in a manner that both maintains a constant output voltage Vout and controls an average of the inductor current, and consequently an average of the AC current $I_{AC}$.

Since the inductor current is increasing in the first state (on-state) and decreasing in the second state (off-state), the on-time and the off-time of the power switch 112 may determine an amount of time that the inductor current increases versus an amount of time that the inductor current decreases. Thus, by varying the on-time and the off-time, the average of the inductor current can be adjusted. For PFC, a closed-loop control may be used to ensure that the output voltage Vout is maintained and that the AC current $I_{AC}$ is sinusoidal and in phase with the AC voltage $V_{AC}$.

The controller 114 may be an integrated circuit (IC) that includes a gate driver configured to drive a gate of the power switch 112 between switching states. For example, the controller 114 may receive one or more inputs as feed-forward parameters and, based on the inputs, generate the PWM control signal 118 that is applied to the gate of power switch 112. The one or more inputs may include or may be related to a measurement of the output voltage Vout, a measurement of the input voltage Vin, a measurement of the output current Iout, and/or a measurement of the output power Pout. In some implementations, the controller 114 may receive a voltage Vzcd from the ZCD winding 116 and may detect zero-crossings of the voltage Vzcd which may be related to zero inductor current. The detected zero-crossings may be used by the controller 114 for PFC. Accordingly, the SMPS 100 may use the power switch 112 to convert the input voltage Vin to the output voltage Vout, and generate the output current Iout. The controller 114 may regulate the PWM control signal 118 based on one or more feed-forward parameters to control the output voltage Vout (e.g., to maintain a constant output voltage Vout). The power switch 112 may receive the PWM control signal 118 in order to control the output voltage, the output current Iout, and/or the output power Pout.

As indicated above, FIG. 1 is provided merely as an example. Other examples may differ from what is described with regard to FIG. 1. For example, in some implementations, the SMPS 100 may have a different converter topology. In some implementations, the controller 114 may be used to control a power switch provided in another type of power converter.

Figure 2:
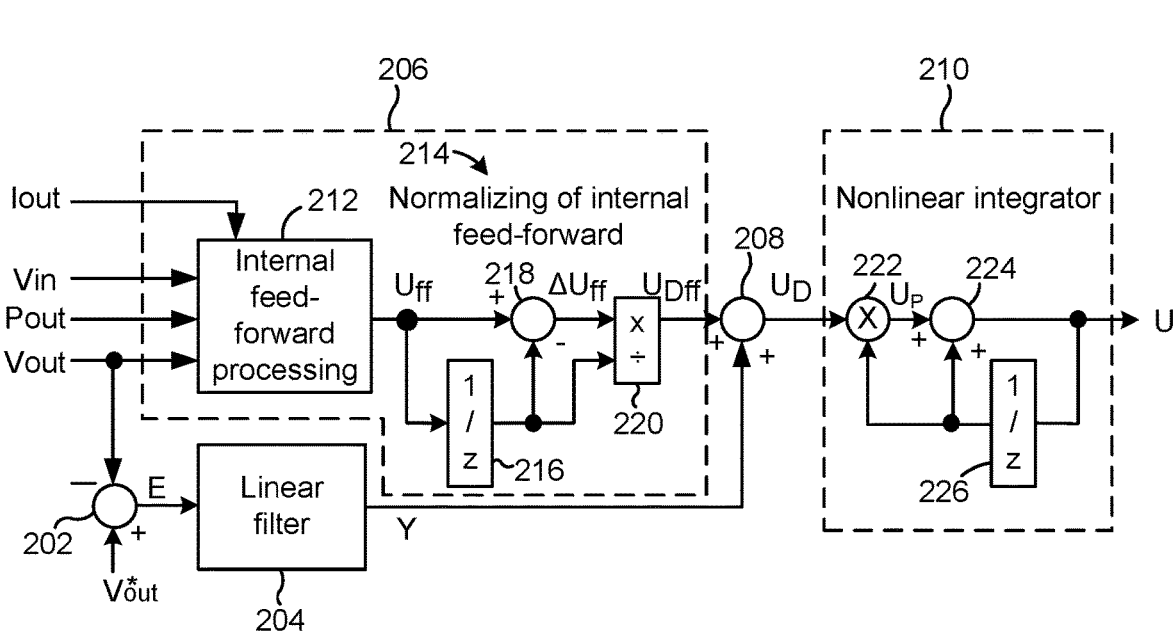
FIG. 2 illustrates a schematic block diagram of a controller according to one or more implementations.

FIG. 2 illustrates a schematic block diagram of a controller 200 according to one or more implementations. The controller 200 may be implemented as the controller 114 described in connection with FIG. 1. Thus, the controller 200 may control the SMPS 100 based on the PWM control signal 118 to convert the input voltage Vin to the output voltage Vout. The controller 200 may include an error generator 202, a filter 204, a feed-forward processing circuit 206, a combiner 208, and a nonlinear integrator 210.

The error generator 202 may generate an error signal E based on a difference between the output voltage Vout and a target output voltage Vout*. For example, the error generator 202 may be a subtractor component configured to subtract the output voltage Vout from the target output voltage Vout* to generate the error signal E. The target output voltage Vout* may be an input variable provided to the controller 200.

The filter 204 may receive the error signal E and generate a filtered error signal Y based on the error signal E. In some implementations, the filter 204 may be a linear filter with a substantially linear transfer function. Thus, the error signal E may be provided as an input to the linear transfer function and the filtered error signal Y may be provided as an output to the linear transfer function. The linear transfer function may be "substantially" linear, meaning the transfer function may not be perfectly linear to account for small non-linearities that may occur, for example, as a result of production error. The linear transfer function may select a certain frequency band to pass. For example, the linear transfer function may provide a low pass filter function (e.g., to suppress AC line ripple).

The feed-forward processing circuit 206 may receive at least one feed-forward parameter related to at least one of the output voltage Vout, the output current Iout, the output power Pout, and the input voltage Vin, and generate a feed-forward signal $U_{Diff}$ based on the at least one feed-forward parameter. In some implementations, the feed-forward processing circuit 206 may monitor a change of the output current Iout corresponding to a change in a load condition of the load, a change of the output voltage Vout, or a change of the input voltage Vin, and generate the feed-forward signal $U_{Diff}$ based on the change of the output current, the change of the output voltage, or the change of the input voltage.

The combiner 208 may generate an integrator input signal $U_D$ based on a sum of the feed-forward signal $U_{Diff}$ and the filtered error signal Y. For example, the combiner 208 may be a summer configured to add the feed-forward signal $U_{Diff}$ and the filtered error signal Y to generate the integrator input signal $U_D$.

The nonlinear integrator 210 may apply a nonlinear integration function to the integrator input signal $U_D$ to generate a control signal U. The control signal U may correspond to the PWM control signal 118 described in connection with FIG. 1. For example, the control signal U may be a PWM control signal that defines the on-time Ton and/or the duty cycle of the power switch 112. Thus, the controller 200 may generate the PWM control signal 118 that is applied to the gate of the power switch 112 based on the on-time defined by the control signal U. In some implementations, the control signal U may be the PWM control signal 118 that is generated according to the on-time.

In some implementations, the feed-forward processing circuit 206 may be configured to generate the feed-forward signal $U_{Diff}$ such that the feed-forward signal $U_{Diff}$ is zero during a steady-state load condition and deviates from zero during a load change in a non-steady-state load condition in order to minimize the filtered error signal Y during the load change. For example, the feed-forward processing circuit 206 may generate the feed-forward signal $U_{Diff}$ with a non-zero value in order to drive the filtered error signal Y toward zero during the load change. The feed-forward signal $U_{Diff}$ may represent a normalized feed-forward value.

In some implementations, the feed-forward processing circuit 206 may generate the feed-forward signal $U_{Diff}$ in order to drive an average of the filtered error signal Y to a target error value. For example, the target error value may be zero or may be some other set value. In some implementations, the feed-forward processing circuit 206 may generate the feed-forward signal $U_{Diff}$ in order to minimize the filtered error signal Y during a load change. In some implementations, the feed-forward processing circuit 206 may generate the feed-forward signal $U_{Diff}$ in order to minimize a magnitude and a duration of a transient deviation of the output voltage Vout from a target value during a load change. In some implementations, the feed-forward signal $U_{Diff}$ represents at least one of a relative change of a load condition or a relative change of an input voltage condition. Thus, the feed-forward processing circuit 206 may monitor a relative load change or a relative change in an input voltage condition based on at least one feed-forward parameter (e.g., Vout, Iout, Vin, and/or Pout), and generate the feed-forward signal $U_{Diff}$ based on the relative load change or the relative change in the input voltage condition.

The feed-forward processing circuit 206 may include a first processing circuit 212 and a second processing circuit 214. The first processing circuit 212 may receive at least one feed-forward parameter (e.g., Vout, Iout, Vin, and/or Pout) and generate an internal feed-forward signal $U_{ff}$ based on a function of the at least one feed-forward parameter. Thus, the first processing circuit 212 may include at least one processor or other processing components. The function may be based on an algorithm, a transfer function, or a mathematical formula corresponding to a converter topology of the SMPS 100. For example, for a boost converter topology, the function may be $U_{ff}$=Pout/Vin. For a boost PFC converter topology, the function may be $U_{ff}$=Pout/<Vin²>, where <Vin²> is an average of Vin². For a critical conduction mode boost PFC converter topology with on-time control, the function may be $U_{ff}$=2L·Pout/<Vin²>, where L is an inductance of the inductor 106. Thus, the SMPS 100 may be a PFC boost converter configurable in a critical conduction mode, and the internal feed-forward signal $U_{ff}$ may be proportional to the output power Pout of the SMPS 100 during the critical conduction mode. For a quasi-resonant flyback converter topology with current control, the function may be $U_{ff}$=2N·Iout (Vin+Vr)/Vin, where N is an effective turns ratio of a transformer of the SMPS and Vr is a flyback voltage. Thus, each function is specific to the converter topology of the SMPS 100, and other functions using one or more feed-forward parameters as input variables may be used for other types of converter topologies. In some implementations, the first processing circuit 212 may calculate the output power Pout based on the output voltage Vout and the output current Iout (e.g., P=I·V) measured by one or more sensors and/or a sensing circuit.

The first processing circuit 212 may generate the internal feed-forward signal $U_{ff}$ based on the function of the at least one feed-forward parameter, such that the internal feed-forward signal $U_{ff}$ is proportional to a steady-state value of the control signal U (e.g., proportional to a steady-state value of the PWM control signal 118). Additionally, the feed-forward signal $U_{Diff}$ may be generated to normalize the internal feed-forward signal $U_{ff}$.

The second processing circuit 214 may include at least one processor or other processing components. For example, the second processing circuit 214 may include a delay element 216, a subtractor component 218, and a calculation circuit 220. The delay element 216 may receive the internal feed-forward signal $U_{ff}$ and delay an output of the internal feed-forward signal $U_{ff}$ by a predetermined number of discrete time steps (e.g., by one or more discrete time steps) or samples. Thus, the delay element 216 may output a previous value $U_{ff}(n-1)$ of the internal feed-forward signal $U_{ff}$, where n is an integer greater than zero.

In some implementations, the controller 200 is a digital controller configured to operate at discrete time steps. For example, the first processing circuit 212 and the second processing circuit 214 may operate at the discrete time steps based on a system clock. The first processing circuit 212 may be configured to update the internal feed-forward signal $U_{ff}$ at each discrete time step. Thus, the previous value $U_{ff}(n-1)$ of the internal feed-forward signal $U_{ff}$ may correspond to a previous discrete time step and the updated value $U_{ff}(n)$ of the internal feed-forward signal $U_{ff}$ may correspond to a most-recent discrete time step.

The subtractor component 218 may subtract the previous value $U_{ff}(n-1)$ of the internal feed-forward signal $U_{ff}$ from the updated value $U_{ff}(n)$ of the internal feed-forward signal $U_{ff}$ to generate a difference value $\Delta U_{ff}$ of the internal feed-forward signal $U_{ff}$. The updated value $U_{ff}(n)$ may represent a current value of the internal feed-forward signal $U_{ff}$. The first processing circuit 212 may update the internal feed-forward signal $U_{ff}$ every clock cycle or at every discrete time step.

The calculation circuit 220 may include a divider configured to divide the difference value $\Delta U_{ff}$ by a value corresponding to the internal feed-forward signal $U_{ff}$ to generate the feed-forward signal $U_{Dff}$. For example, in some implementations, the calculation circuit 220 may divide the difference value $\Delta U_{ff}$ by the previous value previous value $U_{ff}(n-1)$ to generate the feed-forward signal $U_{Dff}$. In some implementations, the calculation circuit 220 may divide the difference value $\Delta U_{ff}$ by another previous sample (e.g., another previous value) of the internal feed-forward signal $U_{ff}$ to generate the feed-forward signal $U_{Dff}$. In some implementations, the calculation circuit 220 may divide the difference value $\Delta U_{ff}$ by an average of two or more previous samples of the internal feed-forward signal $U_{ff}$ to generate the feed-forward signal $U_{Dff}$.

In some implementations, the feed-forward processing circuit 206 may monitor a relative load change or a relative change in an input voltage condition based on the at least one feed-forward parameter, and the second processing circuit 214 may generate the feed-forward signal $U_{Dff}$ based on the relative load change or the relative change in the input voltage condition.

As a result, the second processing circuit 214 may generate the feed-forward signal $U_{Dff}$ to drive the average of the filtered error signal Y to the target error value, to minimize the filtered error signal Y during the load change, and/or to minimize the magnitude and the duration of the transient deviation of the output voltage Vout from the target value during the load change. The second processing circuit 214 may generate the feed-forward signal $U_{Dff}$ such that the feed-forward signal $U_{Dff}$ is zero during the steady-state load condition and deviates from zero during the load change in the non-steady-state load condition in order to minimize the filtered error signal Y during the load change. In addition, any unknown measurement gain error or any unknown circuit parameter used by the first processing circuit 212 to calculate the internal feed-forward signal $U_{ff}$ may be cancelled out due to normalization of the internal feed-forward signal by the second processing circuit 214.

For example, in case of a critical conduction mode boost PFC converter topology with on-time control, a normalized function may be $U_{Dff}=\Delta Pout/Pout$ or $U_{Dff}=\Delta Iout/Iout$. The normalized feed-forward signal (e.g., the feed-forward signal $U_{Dff}$) is not sensitive to tolerance of the inductance L of the inductor 106 or to measurement errors of the input voltage Vin, even though the first processing circuit 212 is making use of these parameters and signals. Instead, the real data of these parameters and signals can be replaced by any constant value.

Similarly, in case of a quasi-resonant flyback converter topology with current control the normalized function may be or $U_{Dff}=\Delta Iout/Iout$. The normalized feed-forward signal (e.g., the feed-forward signal $U_{Dff}$) is not sensitive to tolerance of the effective turns ratio N, measurement errors of the flyback voltage Vr, or the input voltage Vin, even though the first processing circuit 212 is making use of these parameters and signals. Instead, the real data of these parameters and signals can be replaced by any constant value.

The nonlinear integrator 210 may include a multiplier 222, a combiner 224, and a delay element 226. The multiplier 222 may multiply the integrator input signal $U_D$ and a previous value $U_D(n-1)$ of the control signal U (e.g., the PWM control signal 118) to generate a product value $U_P$. The delay element 226 may be arranged in a feedback path and may have an input coupled to an output of the combiner 224. The delay element 226 may receive the control signal U and delay an output of the control signal U by a predetermined number of discrete time steps or samples. Thus, the delay element 216 may output a previous value $U_D(n-1)$ of the control signal U to an input of the multiplier 222 and to an input of the combiner 224. The combiner may generate the control signal U having an updated value $U_D(n)$ based on a sum of the product value $U_P$ and the previous value $U_D(n-1)$ of the control signal U.

As indicated above, FIG. 2 is provided as an example. Other examples may differ from what is described with regard to FIG. 2. The number and arrangement of components shown in FIG. 2 are provided as an example. In practice, the controller 200 may include additional components, fewer components, different components, or differently arranged components than those shown in FIG. 2. Two or more components shown in FIG. 2 may be implemented within a single component, or a single component shown in FIG. 2 may be implemented as multiple, distributed components. Additionally, or alternatively, a set of components (e.g., one or more components) of the controller 200 may perform one or more functions described as being performed by another set of components of the controller 200.

Figure 3:
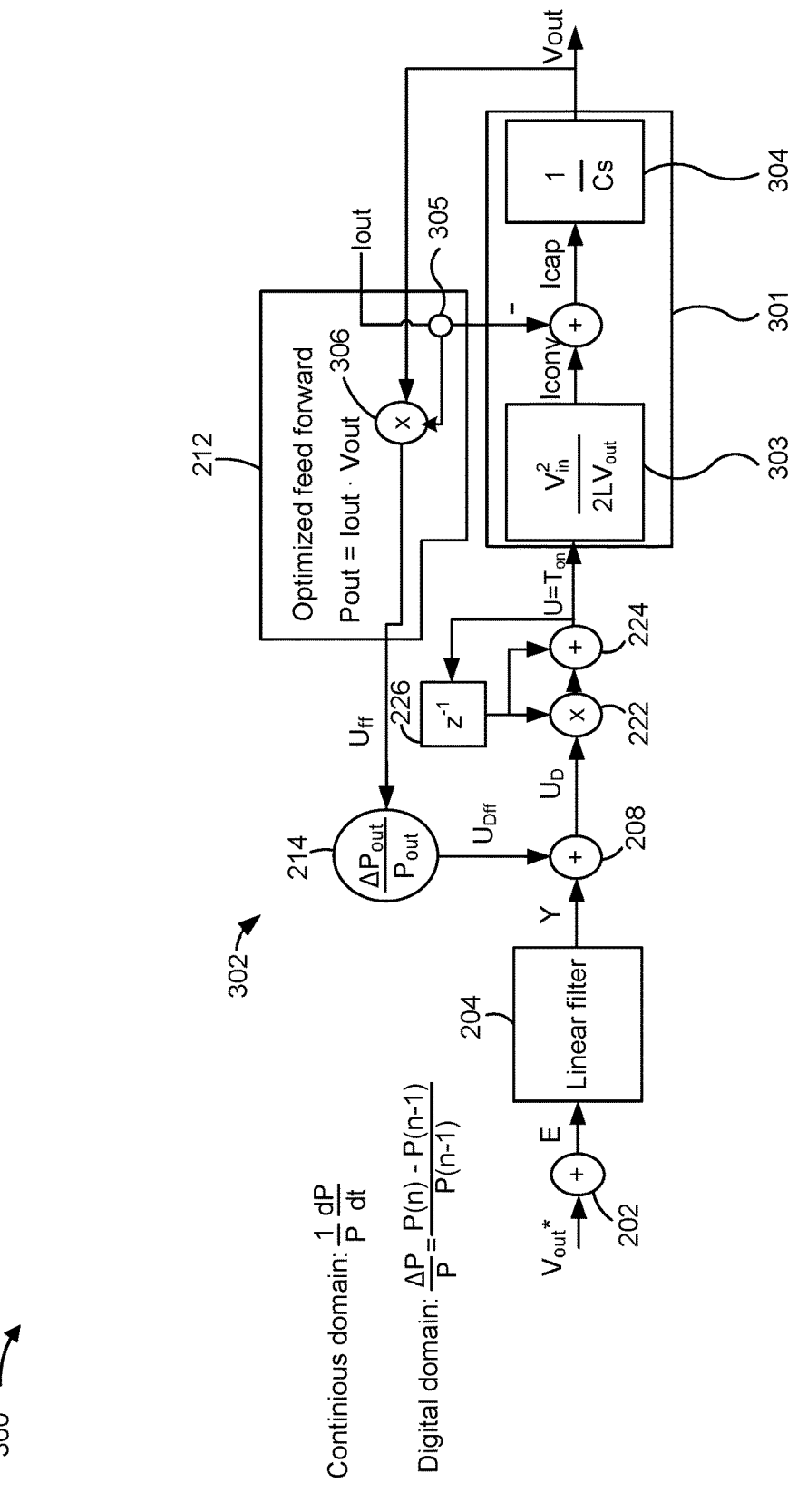
FIG. 3 illustrates a system diagram of a boost PFC converter according to one or more implementations.

FIG. 3 illustrates a system diagram 300 of a boost PFC converter according to one or more implementations. The system diagram 300 may be a representation of the SMPS 100 described in connection with FIG. 1. The system diagram includes a power switching stage 301, including the inductor 106, the diode 108, the capacitor 110, and the power switch 112, and a control circuit 302, including circuitry of the controller 114 (e.g., the controller 200). The power switching stage 301 is represented by a transfer function 303 of a boost power conversion (e.g., $Vin^2/(2LVout)$) and a transfer function 304 of the capacitor 110 (e.g., $1/Cs$).

The first processing circuit 212 may include a current sensor 305 that is configured to sense the output current Iout and provide a sensor signal to a multiplier 306. The multiplier 306 may calculate the output power Pout based on the output current Iout and the output voltage Vout. Thus, the first processing circuit 212 uses the output current Iout and the output voltage Vout as the feed-forward parameters. In some implementations, the output power Pout may be used as one of the feed-forward parameters.

The second processing circuit 214 may generate the feed-forward signal $U_{Dff}$ based on a change $\Delta Pout$ of the output power Pout. The second processing circuit 214 may calculate the feed-forward signal $U_{Dff}$ in a continuous domain or in a digital domain (P=Pout). For example, the feed-forward signal $U_{Dff}$ may be equal to $\Delta Pout/Pout$. Thus, the feed-forward signal $U_{Dff}$ may depend on a time derivative or a rate of change of the output power Pout. For example, the feed-forward signal $U_{Dff}$ may be proportional to the time derivative or the rate of change of the output power Pout. Thus, the feed-forward signal $U_{Dff}$ may represent a relative change of a load condition.

The feed-forward signal $U_{Dff}$ may be combined with the filtered error signal Y to generate the integrator input signal $U_D$. The integrator input signal $U_D$ may be integrated by a nonlinear integration function to generate the control signal U.

As a result, a relative power change may be used for performing a feed-forward compensation in order to avoid errors that may be caused by high manufacturing tolerances and/or uncertainties related to an absolute power measurement. In addition, any unknown measurement gain error or any unknown circuit parameter may be cancelled out due to normalization of the internal feed-forward signal. Furthermore, in a dual-stage power converter, the output power Pout is known from a DC-DC stage. Thus, the output power Pout from the DC-DC stage may be used as a feed-forward parameter.

As indicated above, FIG. 3 is provided as an example. Other examples may differ from what is described with regard to FIG. 3.

Figure 4:
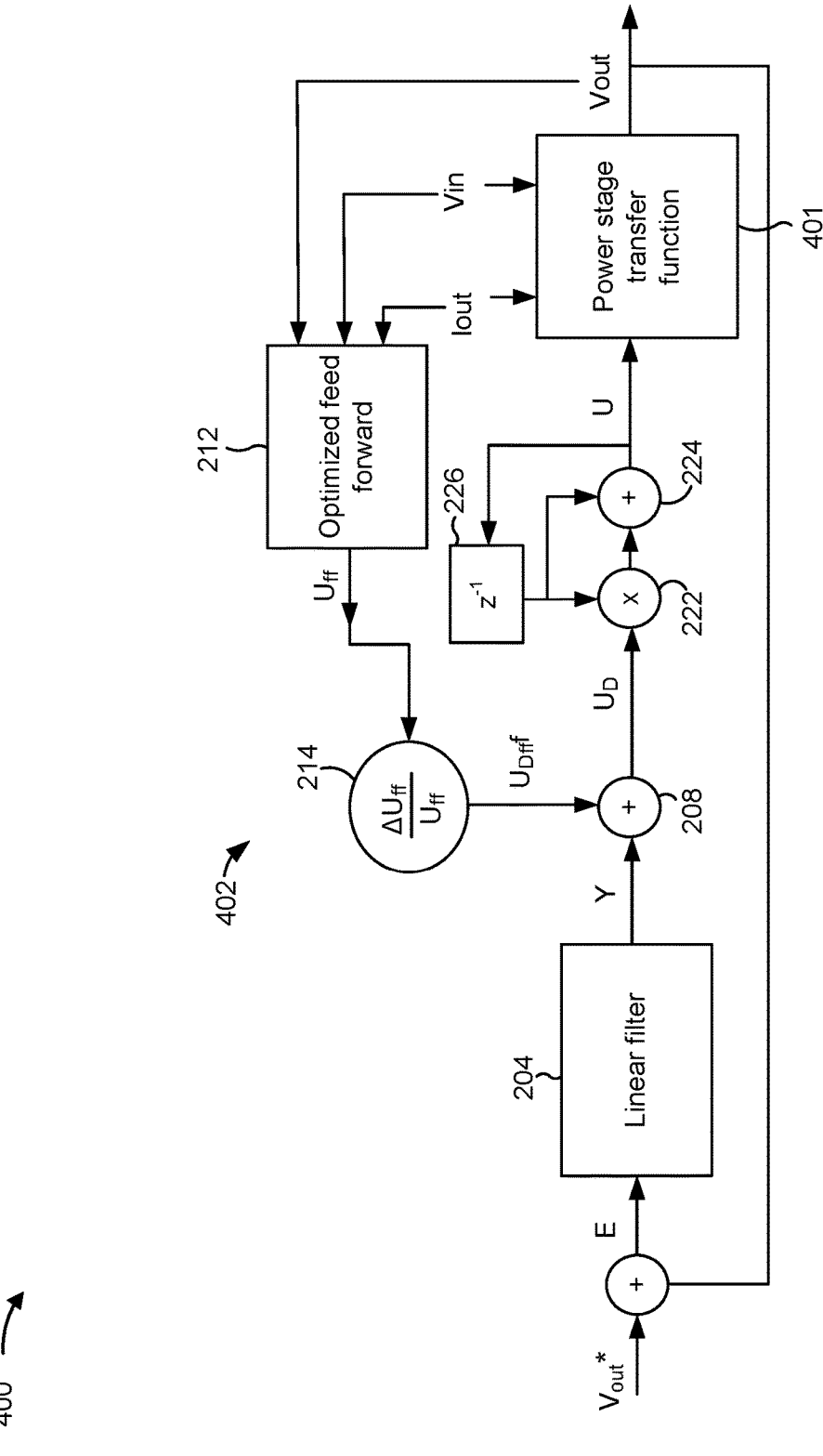
FIG. 4 illustrates a system diagram of a power converter according to one or more implementations.

FIG. 4 illustrates a system diagram 400 of a power converter according to one or more implementations. The power converter may have a converter topology, such as a converter topology of an SMPS. The system diagram 400 includes a power stage 401 and a control circuit 402, including circuitry of the controller 114 (e.g., the controller 200). The power stage 401 may include at least one power switch and may be represented by a power stage transfer function. The first processing circuit 212 may receive the input voltage Vin, the output current Iout, and the output voltage Vout as the feed-forward parameters, and may generate the internal feed-forward signal $U_{ff}$ based on a function of at least one of the feed-forward parameters. The function may correspond to the converter topology of the power converter. In some implementations, the output power Pout may be used as one of the feed-forward parameters.

The second processing circuit 214 may generate the feed-forward signal $U_{Dff}$ based on a change $\Delta U_{ff}$ of the internal feed-forward signal $U_{ff}$. The second processing circuit 214 may calculate the feed-forward signal $U_{Dff}$ in the continuous domain or in the digital domain. For example, the feed-forward signal $U_{Dff}$ may be equal to $\Delta U_{ff}/U_{ff}$. Thus, the feed-forward signal $U_{Dff}$ may depend on a time derivative or a rate of change of the internal feed-forward signal $U_{ff}$. For example, the feed-forward signal $U_{Dff}$ may be proportional to the time derivative or the rate of change of the internal feed-forward signal $U_{ff}$. Thus, the feed-forward signal $U_{Dff}$ may represent a relative change of a load condition or a relative change of an input voltage condition.

The feed-forward signal $U_{Dff}$ may be combined with the filtered error signal Y to generate the integrator input signal $U_D$. The integrator input signal $U_D$ may be integrated by a nonlinear integration function to generate the control signal U.

As a result, a relative load change or a relative input change may be used for performing a feed-forward compensation in order to avoid errors that may be caused by high manufacturing tolerances and/or uncertainties related to an absolute power measurement. In addition, any unknown measurement gain error or any unknown circuit parameter may be cancelled out due to normalization of the internal feed-forward signal. Furthermore, in a single-stage power converter, the output power Pout can be measured at the output of the single-stage power converter. Furthermore, in a dual-stage power converter, the output power Pout is known from a DC-DC stage. Thus, the output power Pout from the output of the single-stage power converter or the DC-DC stage of the dual-stage power converter may be used as a feed-forward parameter.

As indicated above, FIG. 4 is provided as an example. Other examples may differ from what is described with regard to FIG. 4.

The following provides an overview of some Aspects of the present disclosure:

Aspect 1: An SMPS configured to provide an output power to a load, comprising: a power switch (e.g., at least one power switch) configured to receive a PWM control signal to control the output power, wherein the SMPS is configured to use the power switch(es) to convert an input voltage to an output voltage and generate an output current; a controller configured to regulate the PWM control signal for controlling the output voltage, wherein the controller comprises: an error generator configured to generate an error signal based on a difference between the output voltage and a target output voltage; a filter configured to generate a filtered error signal based on the error signal; a feed-forward processing circuit configured to receive at least one feed-forward parameter related to at least one of the output voltage, the output current, the output power, and the input voltage, and generate a feed-forward signal based on the at least one feed-forward parameter; a combiner configured to generate an integrator input signal based on a sum of the feed-forward signal and the filtered error signal; and a nonlinear integrator configured to apply a nonlinear integration function to the integrator input signal to generate the PWM control signal.

Aspect 2: The SMPS of Aspect 1, wherein the filter is a linear filter with a substantially linear transfer function.

Aspect 3: The SMPS of any of Aspects 1-2, wherein the feed-forward processing circuit is configured to generate the feed-forward signal such that the feed-forward signal is zero during a steady-state load condition and deviates from zero during a load change in a non-steady-state load condition in order to minimize the filtered error signal during the load change.

Aspect 4: The SMPS of any of Aspects 1-3, wherein the feed-forward processing circuit is configured to generate an internal feed-forward signal based on a function of the at least one feed-forward parameter, the function corresponding to a topology of the SMPS, wherein the feed-forward processing circuit is configured to subtract a previous value of the internal feed-forward signal from an updated value of the internal feed-forward signal to generate a difference value of the internal feed-forward signal, and wherein the feed-forward processing circuit is configured to divide the difference value by a value corresponding to the internal feed-forward signal to generate the feed-forward signal.

Aspect 5: The SMPS of Aspect 4, wherein the SMPS is a power factor correction (PFC) boost converter configurable in a critical conduction mode, and wherein the internal feed-forward signal is configured to be proportional to the output power of the SMPS during the critical conduction mode.

Aspect 6: The SMPS of Aspect 4, wherein the feed-forward processing circuit is configured to generate the internal feed-forward signal that is proportional to a steady-state value of the PWM control signal.

Aspect 7: The SMPS of any of Aspects 1-6, wherein the PWM control signal is an on-time of the power switch.

Aspect 8: The SMPS of any of Aspects 1-7, wherein feed-forward processing circuit is configured to monitor a relative load change or a relative change in an input voltage condition based on the at least one feed-forward parameter, and generate the feed-forward signal based on the relative load change or the relative change in the input voltage condition.

Aspect 9: A controller configured to control an SMPS based on a PWM control signal to convert an input voltage to an output voltage, the controller comprising: an error generator configured to generate an error signal based on a difference between the output voltage and a target output voltage; a filter configured to generate a filtered error signal based on the error signal; a feed-forward processing circuit configured to monitor a change of an output current corresponding to a change in a load condition, a change of the output voltage, or a change of the input voltage, and generate a feed-forward signal based on the change of the output current, the change of the output voltage, or the change of the input voltage; a combiner configured to generate an integrator input signal based on a sum of the feed-forward signal and the filtered error signal; and a nonlinear integrator configured to apply a nonlinear integration function to the integrator input signal to generate the PWM control signal.

Aspect 10: The controller of Aspect 9, wherein the feed-forward processing circuit is configured to generate the feed-forward signal in order to drive an average of the filtered error signal to a target error value.

Aspect 11: The controller of any of Aspects 9-10, wherein the feed-forward processing circuit is configured to generate the feed-forward signal in order to minimize the filtered error signal during a load change.

Aspect 12: The controller of any of Aspects 9-11, wherein the feed-forward processing circuit is configured to generate the feed-forward signal in order to minimize a magnitude and a duration of a transient deviation of the output voltage from a target value during a load change.

Aspect 13: The controller of any of Aspects 9-12, wherein the feed-forward signal represents at least one of a relative change of a load condition or a relative change of an input voltage condition.

Aspect 14: The controller of any of Aspects 9-13, wherein the feed-forward processing circuit is configured to receive at least one feed-forward parameter, related to at least one of the output voltage, the output current, an output power of the SMPS, and the input voltage, wherein the feed-forward processing circuit is configured to generate an internal feed-forward signal based on a function of the at least one feed-forward parameter, the function corresponding to a topology of the SMPS, wherein the feed-forward processing circuit is configured to subtract a previous value of the internal feed-forward signal from an updated value of the internal feed-forward signal to generate a difference value of the internal feed-forward signal, and wherein the feed-forward processing circuit is configured to divide the difference value by a value corresponding to the internal feed-forward signal to generate the feed-forward signal.

Aspect 15: The controller of Aspect 14, wherein the controller is a digital controller configured to operate at discrete time steps, wherein the feed-forward processing circuit is configured to update the internal feed-forward signal at each discrete time step, and wherein the previous value of the internal feed-forward signal corresponds to a previous discrete time step and the updated value of the internal feed-forward signal corresponds to a most-recent discrete time step.

Aspect 16: The controller of any of Aspects 9-15, wherein the feed-forward processing circuit is configured to generate an internal feed-forward signal that is proportional to a steady-state value of the PWM control signal.

Aspect 17: The controller of any of Aspects 9-16, wherein the nonlinear integrator comprises: a multiplier configured to multiply the integrator input signal and a previous value of the PWM control signal to generate a product value; and a combiner configured to generate the PWM control signal having an updated value based on a sum of the product value and the previous value of the PWM control signal.

Aspect 18: A method of controlling an SMPS based on a PWM control signal to convert an input voltage to an output voltage, the method comprising: generating an error signal based on a difference between the output voltage and a target output voltage; filtering the error signal to generate a filtered error signal; generating a feed-forward signal based on at least one feed-forward parameter related to at least one of the output voltage, the input voltage, an output power of the SMPS, and an output current corresponding to the output voltage; adding the feed-forward signal and the filtered error signal to generate an integrator input signal; and applying a nonlinear integration function to the integrator input signal to generate the PWM control signal.

Aspect 19: The method of Aspect 18, wherein the feed-forward signal is configured to be zero during a steady-state load condition and deviate from zero during a load change in a non-steady-state load condition in order to minimize the filtered error signal during the load change.

Aspect 20: The method of any of Aspects 18-19, further comprising: generating an internal feed-forward signal based on a function of the at least one feed-forward parameter, the function corresponding to a topology of the SMPS; subtracting a previous value of the internal feed-forward signal from an updated value of the internal feed-forward signal to generate a difference value of the internal feed-forward signal; and dividing the difference value by a value corresponding to the internal feed-forward signal to generate the feed-forward signal.

Aspect 21: A system configured to perform one or more operations recited in one or more of Aspects 1-20.

Aspect 22: An apparatus comprising means for performing one or more operations recited in one or more of Aspects 1-20.

Aspect 23: A non-transitory computer-readable medium storing a set of instructions, the set of instructions comprising one or more instructions that, when executed by a device, cause the device to perform one or more operations recited in one or more of Aspects 1-20.

Aspect 24: A computer program product comprising instructions or code for executing one or more operations recited in one or more of Aspects 1-20.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software. Systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPLAs), programmable logic controller (PLC), or other equivalent integrated or discrete logic circuitry. Accordingly, the term "processor," as used herein, refers to any of the foregoing structures or any other structure suitable for implementation of the techniques described herein. Software may be stored on a non-transitory computer-readable medium such that the non-transitory computer readable medium includes program code or a program algorithm stored thereon that, when executed, causes the processor, via a computer program, to perform the steps of a method.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal, further information. "Signal conditioning," as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation, and any other processes required to make a signal suitable for processing after conditioning.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a and b, a and c, b and c, and a, b, and c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A switched-mode power supply (SMPS) configured to provide an output power to a load, comprising:
a power switch configured to receive a pulse-width modulation (PWM) control signal to control the output power, wherein the SMPS is configured to use the power switch to convert an input voltage to an output voltage and generate an output current;
a controller configured to regulate the PWM control signal for controlling the output voltage, wherein the controller comprises:
an error generator configured to generate an error signal based on a difference between the output voltage and a target output voltage;
a filter configured to generate a filtered error signal based on the error signal;
a feed-forward processing circuit configured to receive at least one feed-forward parameter related to at least one of the output voltage, the output current, the output power, or the input voltage, and generate a feed-forward signal based on the at least one feed-forward parameter;
a combiner configured to generate an integrator input signal based on a sum of the feed-forward signal and the filtered error signal; and
a nonlinear integrator configured to apply a nonlinear integration function to the integrator input signal to generate the PWM control signal.

2. The SMPS of claim 1, wherein the filter is a linear filter with a substantially linear transfer function.

3. The SMPS of claim 1, wherein the feed-forward processing circuit is configured to generate the feed-forward signal such that the feed-forward signal is zero during a steady-state load condition and deviates from zero during a load change in a non-steady-state load condition in order to minimize the filtered error signal during the load change.

4. The SMPS of claim 1, wherein the feed-forward processing circuit is configured to generate an internal feed-forward signal based on a function of the at least one feed-forward parameter, the function corresponding to a topology of the SMPS, wherein the feed-forward processing circuit is configured to subtract a previous value of the internal feed-forward signal from an updated value of the internal feed-forward signal to generate a difference value of the internal feed-forward signal, and wherein the feed-forward processing circuit is configured to divide the difference value by a value corresponding to the internal feed-forward signal to generate the feed-forward signal.

5. The SMPS of claim 4, wherein the SMPS is a power factor correction (PFC) boost converter configurable in a critical conduction mode, and wherein the internal feed-forward signal is configured to be proportional to the output power of the SMPS during the critical conduction mode.

6. The SMPS of claim 4, wherein the feed-forward processing circuit is configured to generate the internal feed-forward signal that is proportional to a steady-state value of the PWM control signal.

7. The SMPS of claim 1, wherein the PWM control signal is an on-time of the power switch.

8. The SMPS of claim 1, wherein the feed-forward processing circuit is configured to monitor a relative load change or a relative change in an input voltage condition based on the at least one feed-forward parameter, and generate the feed-forward signal based on the relative load change or the relative change in the input voltage condition.

9. A controller configured to control a switched-mode power supply (SMPS) based on a pulse-width modulation (PWM) control signal to convert an input voltage to an output voltage, the controller comprising:

an error generator configured to generate an error signal based on a difference between the output voltage and a target output voltage;

a filter configured to generate a filtered error signal based on the error signal;

a feed-forward processing circuit configured to monitor a change of an output current corresponding to a change in a load condition, a change of the output voltage, or a change of the input voltage, and generate a feed-forward signal based on the change of the output current, the change of the output voltage, or the change of the input voltage;

a combiner configured to generate an integrator input signal based on a sum of the feed-forward signal and the filtered error signal; and a nonlinear integrator configured to apply a nonlinear integration function to the integrator input signal to generate the PWM control signal.

10. The controller of claim 9, wherein the feed-forward processing circuit is configured to generate the feed-forward signal in order to drive an average of the filtered error signal to a target error value.

11. The controller of claim 9, wherein the feed-forward processing circuit is configured to generate the feed-forward signal in order to minimize the filtered error signal during a load change.

12. The controller of claim 9, wherein the feed-forward processing circuit is configured to generate the feed-forward signal in order to minimize a magnitude and a duration of a transient deviation of the output voltage from a target value during a load change.

13. The controller of claim 9, wherein the feed-forward signal represents at least one of a relative change of a load condition or a relative change of an input voltage condition.

14. The controller of claim 9, wherein the feed-forward processing circuit is configured to receive at least one feed-forward parameter, related to at least one of the output voltage, the output current, an output power of the SMPS, or the input voltage, wherein the feed-forward processing circuit is configured to generate an internal feed-forward signal based on a function of the at least one feed-forward parameter, the function corresponding to a topology of the SMPS, wherein the feed-forward processing circuit is configured to subtract a previous value of the internal feed-forward signal from an updated value of the internal feed-forward signal to generate a difference value of the internal feed-forward signal, and wherein the feed-forward processing circuit is configured to divide the difference value by a value corresponding to the internal feed-forward signal to generate the feed-forward signal.

15. The controller of claim 14, wherein the controller is a digital controller configured to operate at discrete time steps, wherein the feed-forward processing circuit is configured to update the internal feed-forward signal at each discrete time step, and wherein the previous value of the internal feed-forward signal corresponds to a previous discrete time step and the updated value of the internal feed-forward signal corresponds to a most-recent discrete time step.

16. The controller of claim 9, wherein the feed-forward processing circuit is configured to generate an internal feed-forward signal that is proportional to a steady-state value of the PWM control signal.

17. The controller of claim 9, wherein the nonlinear integrator comprises:

a multiplier configured to multiply the integrator input signal and a previous value of the PWM control signal to generate a product value; and a combiner configured to generate the PWM control signal having an updated value based on a sum of the product value and the previous value of the PWM control signal.

18. A method of controlling a switched-mode power supply (SMPS) based on a pulse-width modulation (PWM) control signal to convert an input voltage to an output voltage, the method comprising:

generating an error signal based on a difference between the output voltage and a target output voltage;

filtering the error signal to generate a filtered error signal;

generating a feed-forward signal based on at least one feed-forward parameter related to at least one of the output voltage, the input voltage, an output power of the SMPS, or an output current corresponding to the output voltage;

adding the feed-forward signal and the filtered error signal to generate an integrator input signal; and applying a nonlinear integration function to the integrator input signal to generate the PWM control signal.

19. The method of claim 18, wherein the feed-forward signal is configured to be zero during a steady-state load condition and deviate from zero during a load change in a non-steady-state load condition in order to minimize the filtered error signal during the load change.

20. The method of claim 18, further comprising:

generating an internal feed-forward signal based on a function of the at least one feed-forward parameter, the function corresponding to a topology of the SMPS;

subtracting a previous value of the internal feed-forward signal from an updated value of the internal feed-forward signal to generate a difference value of the internal feed-forward signal; and dividing the difference value by a value corresponding to the internal feed-forward signal to generate the feed-forward signal.

\* \* \* \* \*